United States Patent [19]

Fujikake

[11] 4,313,248
[45] Feb. 2, 1982

[54] METHOD OF PRODUCING HEAT TRANSFER TUBE FOR USE IN BOILING TYPE HEAT EXCHANGERS

[75] Inventor: Jun Fujikake, Yamato-Kooriyama, Japan

[73] Assignee: Fukurawa Metals Co., Ltd., Tokyo, Japan

[21] Appl. No.: 34,920

[22] Filed: May 1, 1979

Related U.S. Application Data

[62] Division of Ser. No. 881,860, Feb. 27, 1978, Pat. No. 4,216,826.

[30] Foreign Application Priority Data

Feb. 25, 1977 [JP] Japan .................................. 52/20084
Feb. 25, 1977 [JP] Japan .................................. 52/20085
Nov. 25, 1977 [JP] Japan .................................. 52/143719

[51] Int. Cl.³ ............................................. B23P 15/26
[52] U.S. Cl. ............................... 29/157.3 A; 29/157.4;
29/157.3 AH; 29/DIG. 23; 165/133; 165/179;
62/527; 72/367; 72/112; 72/122; 72/123;
72/98; 72/100; 72/67
[58] Field of Search .................... 62/527; 165/133, 179;
29/157.3 A, 157.3 AH, 727, DIG. 23; 72/112,
122, 100, 98, 67, 367

[56] References Cited

U.S. PATENT DOCUMENTS

| | | | |
|---|---|---|---|
| Re. 30,077 | 8/1979 | Kun et al. | 165/133 |
| 2,586,011 | 2/1952 | Doelter | 29/157.3 AH |
| 3,299,949 | 1/1967 | Beurtheret | 165/133 |
| 3,383,892 | 5/1968 | Brothen | 29/157.3 AH |
| 3,487,670 | 1/1970 | Ware | 165/133 |
| 3,566,514 | 3/1971 | Szumigala | 165/133 |
| 3,683,656 | 8/1972 | Lewis | 29/157.3 AH |
| 3,768,290 | 10/1973 | Zatell | 29/157.3 AH |
| 4,004,441 | 1/1971 | Leszak | 165/133 |
| 4,159,739 | 7/1979 | Orothers et al. | 165/133 |
| 4,168,618 | 9/1979 | Saier et al. | 29/157.3 AH |
| 4,179,911 | 12/1979 | Saier et al. | 29/157.3 AH |

FOREIGN PATENT DOCUMENTS

| | | | |
|---|---|---|---|
| 165717 | 4/1950 | Austria | 29/157.3 A |
| 2735762 | 2/1979 | Fed. Rep. of Germany | 29/157.3 AH |
| 1532278 | 6/1968 | France | 29/157.3 AH |

Primary Examiner—Nicholas P. Godici
Assistant Examiner—V. K. Rising
Attorney, Agent, or Firm—Armstrong, Nikaido, Marmelstein & Kubovcik

[57] ABSTRACT

The invention is concerned with a heat transfer tube for use in boiling type heat exchangers, having an excellent heat transfer performance. More specifically, the invention relates to a surface condition of the heat transfer tube for improving the heat transfer performance and a method of producing the tube easily, especially a method for processing the surface condition efficiently and advantageously from an industrial point of view. The essential feature of the invention resides in a provision of a surface condition for promoting the boiling which consists of annular or spiral cavities extending along the tube surface in the circumferential direction of the latter, as well as narrow gaps extending along the cavities so as to allow the cavities to communicate the outside space. If necessary, spiral or annular fins may be provided on the tube surface, so as to improve the boiling performance at the outside of the tube. Further, as a mechanism for promoting the boiling also in the axial direction of the tube, as well as in the circumferential direction, axially extending cavities and narrow gaps extending along the axially extending cavities for communication of the latter with the outside space may be formed on the tube surface, so as to remarkably improve the boiling performance at the outside of the tube.

6 Claims, 20 Drawing Figures

METHOD OF PRODUCING HEAT TRANSFER TUBE FOR USE IN BOILING TYPE HEAT EXCHANGERS

This is a division of application Ser. No. 881,860, filed Feb. 27, 1978, now U.S. Pat. No. 4,216,826, issued Aug. 12, 1980.

BACKGROUND OF THE INVENTION

The present invention relates to a heat transfer tube of boiling type heat exchanger, having a high heat transfer coefficient and easy to manufacture, as well as to the method of producing the same.

In general, heat transfer tubes of boiling type heat exchanger have surface conditions which allow residual bubbles on the heat transfer surface, and are adapted to be dipped in liquids such as fron, water, liquefied nitrogen and liquefied oxygen, so as to effectively heat these liquids to make them boil.

Various types of the boiling type heat transfer tubes have been developed up to now. These pipes are, for example, (I) the heat transfer tube having a porous layer formed on its surface by sintering metallic powders, and (II) the heat transfer tube having annular or spiral cavities communicating the outside through gaps, formed by bending the top ends of a number of fins, which have been made even previously on the tube surface, in the longitudinal direction of the tube.

However, the heat transfer tube of the type (I) above, relying upon the sintering, is disadvantageous in that the tube is likely to be softened to reduce its strength during the sintering process and that the manufacturing cost is relatively high.

At the same time, the heat transfer tube of the type (II) above having a number of bent fins has such a drawback that the fins, which have to be formed to have a considerably large height, can hardly be formed on the surface of tube of hard materials such as stainless steel, and exhibit poor bending workability.

Under these circumstances, the present invention aims at providing, as a fruit of an intense study, a heat transfer tube for use in boiling type heat exchangers, having an improved heat transfer characteristic owing to provision of cavities on the tube surface for forming residual bubbles which promotes the nucleous boiling and which can easily be formed even on the tube of relatively hard material, as well as a method of producing the heat transfer tube.

More specifically, the present invention is concerned with a heat transfer tube for use in boiling type heat exchangers, having annular or spiral cavities formed on its surface, the cavities communicating the outside space through narrow gaps extending in the longitudinal direction of the cavities.

At the same time, the present invention is concerned with a method of producing a heat transfer tube for use in boiling type heat exchangers, comprising the steps of forming a number of fins on the tube surface by means of fin-forming tool, and compressing and forming the top ends of the fins so as to form annular or spiral grooves communicating the outside space through narrow gaps.

Another object of the invention is to provide a heat transfer tube for use in boiling type heat exchangers in which fins having a large heat transfer surface are formed, in addition to the above stated cavities for forming bubbles to promote the nucleous boiling, so as to improve the heat transfer performance.

To this end, the present invention is concerned with a heat transfer tube for use in boiling type heat exchangers having a number of annular or spiral fins formed on its surface, the cavities communicating the outside space through narrow gaps formed to extend in the direction of these cavities, and annular or spiral fins disposed to project to the space between adjacent gaps.

In another aspect, the invention is concerned with a method of producing a heat transfer tube for use in boiling type heat exchanger comprising, forming a number of thick-walled annular or spiral fins on the tube surface by means of a fin-forming tool, and compressing and forming the shoulder portions of adjacent thick-walled fins by means of a single or multiple staged compression-forming disk tool having a diameter smaller than that of the fin-forming tool and a breadth smaller than the pitch of the fins, so as to form at the bottoms of the thick-walled fins cavities which communicate with the outside space through narrow gaps, as well as annular or spiral projecting fins between the adjacent gaps on the tube surface.

Conventionally, there have been proposed various surface conditions for promoting and enhancing the heating and boiling characteristics. However, these conventional mechanisms involve problems or shortcomings in relation with the heat transfer performance, difficulty in manufacturing, production cost and so forth, although they may have certain advantages.

For instance, the aforementioned heat transfer tube having a porous surface layer formed by sintering of metallic powders is likely to deteriorate in heat transfer performance due to the clogging of the cavities. At the same time, in the heat transfer tube having a surface condition consisting of a number of fine cavities and openings through which the cavities communicate with the outside space, the cavities are oriented unidirectionally, e.g. only in the circumferential direction of the tube, so that it is difficult and costly to improve the heat transfer performance through making the pitch of the cavities small.

Also, as to the production of the heat transfer tube, almost no tube has been proposed, which can be produced by only one step and which can be handled, when installed in a heat exchanger, in such a simple manner as ordinary smooth tubes or low fin tubes.

Under these circumstances, the present invention provides as its still another object, a heat transfer tube in which the boiling performance at the outside of the tube is improved by provision of such a surface condition as would promote the boiling not only in the circumferential direction but in axial direction of the tube as well.

Thus, the present invention is concerned also with a heat transfer tube and the method of producing the same, comprising annular or spiral cavities formed beneath the tube surface to extend in the circumferential direction of the tube and disposed at a desired pitch in the axial of the cross-section of the cavities irregularly changing in the longitudinal direction thereof, the cavities having normally irregularly shaped restricted gaps or openings through which these cavities communicate with the outside space, the gaps or openings extending along the cavities continuously or discontinuously, and small cavities formed under the outer surface to extend in the axial direction of the tube at a desired circumferential pitch so as to connect adjacent gaps to each other or adjacent openings to each other, the small cavities also having gaps or openings through which they communicate with the outside space. The small cavities and their gaps or openings may be in the form of small grooves having convexities and concavities in its both sides and bottom, as occasion demands.

In carrying out the invention, for achieving the objects of the invention more effectively, it is useful to provide fins protruding with their longitudes extending in the circumferential direction, at the centers of the portions between adjacent first-mentioned circumferentially extending annular or spiral cavities and between adjacent second-mentioned axially extending cavities or grooves, and to effect a knurling over the entire surface of the tube excepting the protruding fins.

The invention will be more fully understood from the following description of the preferred embodiments taken in conjunction with the accompanying drawings in which:

BRIEF DESCRIPTION OF THE DRAWINGS

FIG. 14 is an illustrations of processing of the surface condition in accordance with the third embodiment of the invention and of the tools employed in the processing, FIG. 14-1 is a plan view of a first compression-forming tool 108 as shown in FIG. 14, FIG. 14-2 is an enlarged view of the mountain-shaped teeth of the above mentioned tool 108, FIG. 15 is a partial enlarged view of a shape processed by the above mentioned tool 108.

DESCRIPTION OF THE PREFERRED EMBODIMENTS

First Embodiment (FIGS. 1 to 4)

Figure 1:
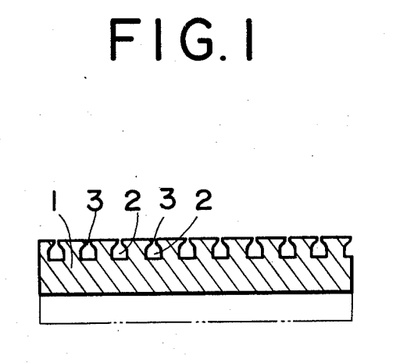
FIG. 1 is a sectional view of a heat transfer tube in accordance with the present invention.

FIG. 1 shows in section a heat transfer tube in accordance with the invention for use in boiling type heat exchangers. The heat transfer tube is made of a metal tube 1 of copper, aluminum, stainless steel and so forth, with annular or spiral cavities 2 formed in its surface, as well as narrow gaps 3 of a mean width of smaller then 0.13 mm and extending in the longitudinal direction of the cavities 2, i.e. in the circumferential direction of the tube, so as to make the cavities communicate the outside space.

Hereinafter, an explanation will be made as to the method of producing the above stated heat transfer tube.

Figure 2:
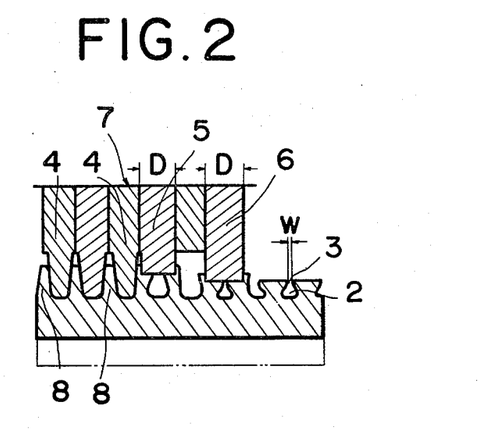
FIG. 2 is an illustration explanatory of a step for forming the heat transfer tube as shown in FIG. 1.

Referring to FIG. 2, a rolling tool 7, which has fin-forming disk tools 4 . . . and two stages of compression-forming disk tools 5, 6 coaxial with the fin-forming tool, is pressed onto the surface of the tube, so as to form fins 8 . . . by rolling. The fin 8 may be singular or made in plural, and may be annular or spiral.

Subsequent to the formation of these fins 8 . . . , the upper of the successive fins 8 are compressed and formed by the two stages of compression-forming disk tools 5, 6, which has a breadth D larger than the pitch of the fins 8 and a diameter smaller than that of the fin-forming disk tool 4, so as to form at the bottoms of successive fins 8 cavities 2 having narrow gaps 3 through which the cavities communicate the outside space as shown in the chain-line circle. (FIG. 2)

The compression-forming disk tools 5, 6 have an equal breadth D but different diameters. Thus, at first the slight formation of the upper of the successive fins 8 is effected by the first stage compression-forming disk tool 5 of a smaller diameter, and then the compression-forming is completed by the second stage compression-forming disk tool 6 of the larger diameter.

Figure 3:
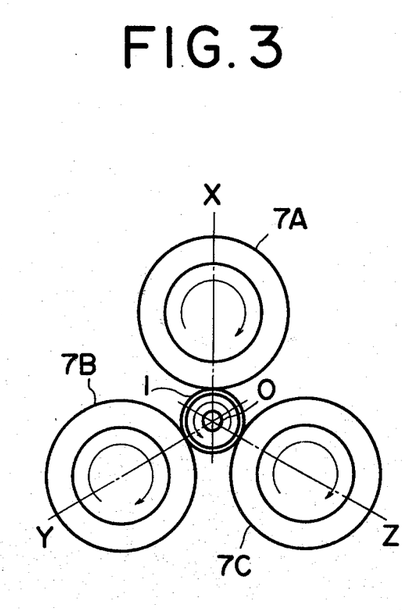
FIG. 3 is an illustration showing the process for forming the tube by means of three rolling tools in combination.
Figure 4:
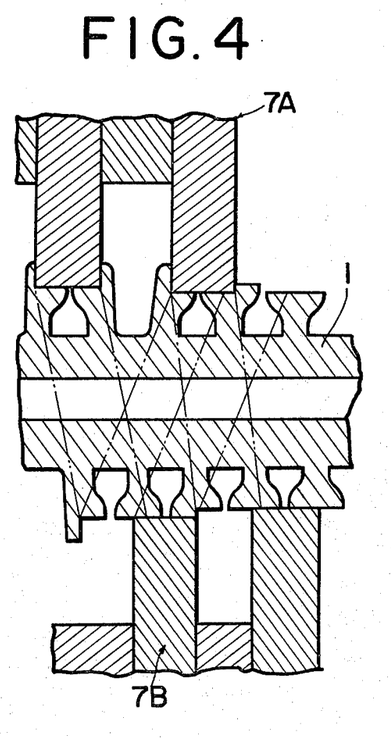
FIG. 4 is a sectional view taken along the line X—0—Y of FIG. 3.

At the same time, it is to be noted that an excessively large stress will be caused in the bottom of the fin 8, when the upper whole portion of the fin 8 is compressed and formed at one time, possibly resulting in buckling of the fin. To avoid this, the compression-forming disk tools 5 and 6 are preferably spaced from each other by one pitch of the fin, so that only one sides of fins may be compressed and formed at a time, as shown in FIG. 2. The rolling tool 7 having the fin-forming disk tools 4 . . . and compression-forming disk tools 5, 6 mounted coaxially with each other is not exclusive. For instance, the cavities and the gaps may be formed by means of three rolling tools 7A, 7B and 7C which are arranged at 120° intervals, as shown in FIGS. 3 and 4. In this case, the three rolling tools are displaced in the axial direction by a distance corresponding to ⅓ of the pitch of the fins 8, and the fin-forming disk tools 4 . . . and the compression-forming disk tools 5, 6 are mounted in conformity with the spiral angle of the fins 8.

Representing the outer diameter of the fins 8 by d, the spiral angle $\alpha$ is given by the equation of tan $\alpha = P/\pi d$. Thus, in case two or three starts of fins 8 are formed, the spiral angles are given by the equations of tan $\alpha = 2P/\pi d$ and $\tan \alpha = 3P/\pi d$, respectively. This relationship concerning the spiral angle is equally adopted in determining the mounting angle of the compression-forming disk tools 5, 6.

At the same time, it is to be noted that the compression-forming disk tools 5, 6, which have been described as consisting of two stages, can have other number of stages. Namely, a single or triple stages of compression-forming disk tools can be used as well.

In addition, although the compression-forming of the fins in the described-example is performed immediately after the formation of the same, by a rolling tool in which the fin-forming disk tools 4 and the deforming disk-tools 5, 6 are mounted coaxially, the formation of the fins and the compression-forming out separately.

Further, the fins 8 may be formed by other means than rolling, e.g. cutting.

The above described method is preferred because it affords an easy adjustment of the size of the cavities 2 and the width W of the gaps, by simply changing the diameters of the compression-forming disk tools. At the same time, since the method of invention causes only a small amount of compression-forming of the material in forming the fins 8, a surface condition shaped to have an excellent heat transfer characteristic can easily be formed, even on the tubes made of a hard material such as stainless steel.

More specifically, according to conventional fin-formation technique, the fin has to have a height of 1.2 to 1.5 mm, when the pitch of the fins falls within a range of 19 to 26 fins per inch, and 0.8 mm when the pitch is reduced to 35 fins per inch, whereas the height of the fins is as small as 0.5 to 0.8 mm, according to the fin-formation technique of the invention. Further, the distance between adjacent fins which has been according to the conventional technique 1 mm and 0.6 to 0.7 mm for pitches of 19 fins per inch and 26 fins per inch, respectively, can be made as small as 0.3 to 0.4 mm, according to the technique of the invention. That is, the compression-forming amount is extremely small when the tube is processed by the technique in accordance with the invention.

Furthermore, since the diameter of the tube according to the invention can be made sufficiently small, and since the skip section can be provided as required, the tube in accordance with the invention can be fitted into the tube plate in a simple manner as is the case of ordinary bare tube and low fin tube.

Hereinafter, an experimental example of the tube in accordance with the first embodiment of invention will be described.

Experimental Example 1

A copper tube 1 18.88 mm outer dia. and 1.19 mm thick was processed by means of a rolling tool 7 as shown in FIG. 2. More specifically, the rolling tool 7 incorporated fin-forming disk tools 4 . . . having an outer dia. of 52.45 mm, breadth at the outer end of 0.35 mm and taper angle of both side walls of 4°, as well as a first and a second stages of compression-forming disk tools 5, 6 having respective outer dias. of 51.2 mm and 51.6 mm and a common breadth of 0.8 mm.

During the processing of the copper tube 1 by the above stated rolling tool, at first fins 8 . . . of 0.75 mm height were formed at a pitch of 35 fins per inch and, subsequently, the fins were compressed to form a heat transfer tube for a boiling type heat exchanger having a surface condition with cavities 2 of 0.4 mm depth and gaps 3 of 0.035 mm breadth, as shown in FIG. 1.

As has been described, according to this embodiment of the invention, cavities for allowing bubbles, which promote the nucleous boiling of the liquid, to reside therein are formed on the tube surface and communicate outside space through gaps, so as to ensure an excellent heat transfer performance. In addition, since the method of this embodiment requires only a small amount of compression-forming the processing can easily be performed even with tubes made of hard materials, and an uniform surface condition is obtained over the entire surface of the tube, so as to provide a heat transfer tube for boiling type heat exchangers of reduced fluctuation of heat transfer performance.

Second Embodiment (FIGS. 5 to 13)

Figure 5:
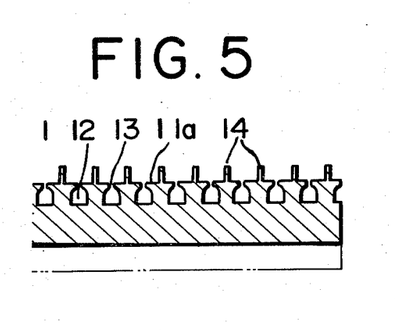
FIG. 5 is a sectional view of another embodiment of the heat transfer tube in accordance with the invention.

FIG. 5 shows in section an example of a heat transfer tube for boiling type heat exchanger, in accordance with the second embodiment of the invention. This tube is provided on its surface with a number of annular of spiral cavities 12 and narrow gaps 13 of a mean breadth of smaller than 0.13 mm, extending along the longitudinal direction of the cavities 12, i.e. in the circumferential direction of the tube, through which the cavities communicate the outside space. The tube further has annular or spiral fins 14 formed in its surface 11a at portions of the latter between adjacent gaps 13, 13.

The heat transfer tube having above described surface mechanism can be formed in the following manner. At first, by way of example, a process will be described in which a rolling tool having fin-forming disk tools 15 . . . and coaxial two stages of compression-forming disk tools as shown in FIG. 6 is used.

At first, the fin-forming disk tools 15 are pressed onto the surface of a tube made of a metallic material such as copper, aluminum, stainless steel and so forth, so as to form thick-walled fins 19 on the tube surface.

The thick-walled fins 19 may not always be singular but may be formed in plural, and may be either annular or spiral.

Figure 6:
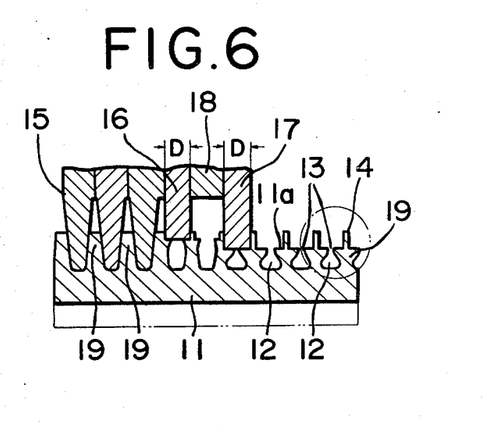
FIG. 6 is an illustration explanatory of a step for forming the host transfer tube as shown in FIG. 5.

After forming the thick-walled fins 19 on the tube surface, two stages of compression-forming disk tools 16, 17 having a breadth D smaller than the pitch P of the fins and outer diameters smaller than that of the fin-forming disk tools 15 are pressed onto the tube surface, so as to compress and deform the shoulders of the thick-walled fins 19, thereby to form at the bottoms of the fins, as specifically shown in the circle of chain line in FIG. 6, cavities 12 which communicate the outside space through narrow gaps 13, and, in addition, thin-walled fins 14 . . . of a breadth equal to the difference between the pitch P of the thick-walled fins and the breadth D of the compression-forming disk tools 16, 17, at portions of the tube surface between the adjacent gaps 13, 13.

The compression-forming disk tools 16, 17 used in this process have the same breadth D but have different diameters. More specifically, at first the shoulders of the thick-walled fins 19 are slightly deformed by the first stage compression-forming disk tool 16 of a smaller diameter, and then compression-forming completely into the final shape by the second stage compression-forming disk tool 17 of the larger diameter.

Figure 7:
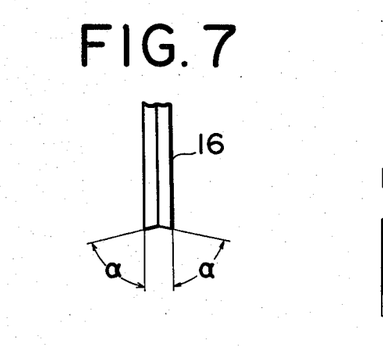
FIG. 7 is a side elevational view of a disk-shaped compression-forming tool which is used in forming the heat transfer tube of the second embodiment.

At the same time, it is preferred to form the edges of the compression-forming disk tools 16, 17 to have apex angles $\alpha$ smaller than 90°, as shown in FIG. 7, so that these edges may play the role of the cutting edges.

Further, it is to be noted here that an excessively large stress will be caused in the bottom of the fins 19, if the whole portion of the fin 8 is compressed and compression-forming at a time, possibly resulting in buckling of the fin. To avoid this, the compression-forming disk tools 16 and 17 are preferably spaced from each other by one pitch of the fins, so that only one side of fins may be compressed and formed at a time, as will be seen from FIG. 6.

Figure 8:
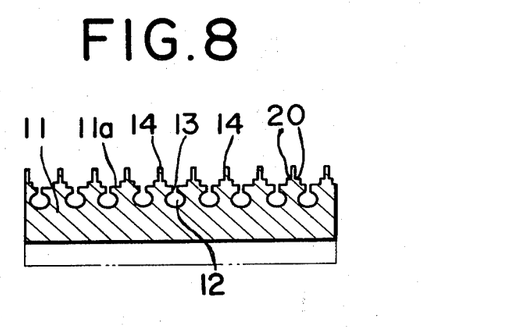
FIG. 8 is a sectional view of a heat transfer tube which is a modification of the tube in accordance with the invention.

FIG. 8 shows a heat transfer tube which is a modification of the second embodiment under description. This heat transfer tube has steps 20, 20 at both side base portions of the fins 14 shaped by the compression-forming.

Figure 9:
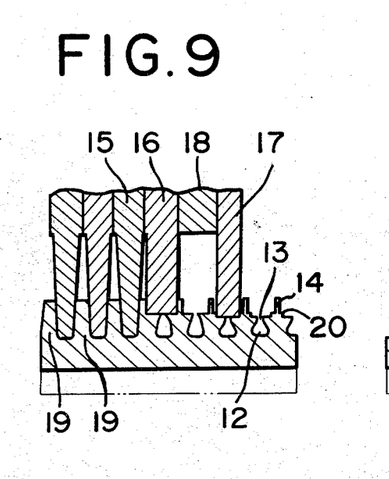
FIGS. 9 and 10 are illustrations explanatory of the steps for forming the heat transfer tube as shown in FIG. 8.

This tube is produced by making use of a rolling tool 18' as shown in FIG. 9. The rolling tool 18' has a fin-forming disk tool 15 and two stages of compression-forming disk tools 16, 17 which are mounted coaxially. This rolling tool has almost the same construction as that shown in FIG. 6, except that the second stage compression-forming disk tool 17 has a breadth smaller than that of the first stage compression-forming disk tool 16. Also, the second stage tool 17 has a diameter larger than that of the first stage tool 16. Consequently, steps 20 are formed to have a height equal to a half of the differential of the outer diameters of the compression-forming disk tools 16, 17.

Figure 10:
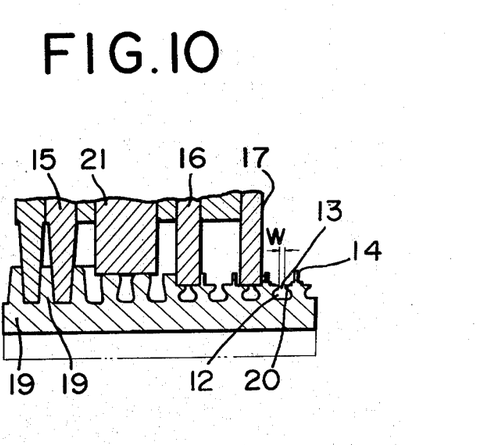

The construction of the rolling tool 18' as stated above is not exclusive. For instance, it is possible to use an intermediate compression-forming disk tool 21 which is provided at a portion thereof between the fin-forming disk tool 15 and the first stage compression-forming disk tool 16 with an intermediate compression-forming disk tool having a diameter smaller than that of the first stage compression-forming disk tool 16 and a breadth equal to one to several pitches of the fins, so as to slightly compress and deform the irregularly shaped ends of the thick-walled fins 19 to smoothen the same, thereby to ensure a smooth and uniform finishing by the subsequent deforming step.

Although the compression-forming disk tools have been described to have two and three stages, this is not exclusive and the compression-forming disk tool may be formed to have other numbers of stages such as one or more than 4.

At the same time, although the embodiment has been described to continuously and successively perform the fin-formation and the deformation by making use of a rolling tool in which the fin-forming disk tool 15 and the compression-forming disk tools 16, 17 are coaxially mounted, it is possible to carry out the formation of the fins and the compression-forming separately.

Further, the thick-walled fins 19 may be formed by other means than the rolling as described, e.g. by cutting.

The above-described method is advantageous in that it affords easy adjustment of the size of the cavities 2 and the width W of the gaps, by simply changing the diameters of the compression-forming disk tools 16, 17, as well as simultaneous formation of the cavities 12 and the fins 4. At the same time, since the method of the invention causes only a small amount of compression-forming of the material in forming the thick-walled fins 19, a surface mechanism shaped to have an excellent heat transfer characteristic can easily be formed, even on the tubes made of a hard material such as stainless steel.

More specifically, according to conventional fin-formation technique, the fin has to have a height of 1.2 to 1.5 mm, when the pitch of the fins falls within a range of 19 to 26 fins per inch, and 0.8 mm when the pitch is reduced to 35 fins per inch, whereas the height of the fins is enough as small as 0.5 to 0.8 mm, according to the fin-formation technique of the invention. Further, the distance between adjacent fins which has been, according to the conventional technique 1 mm and 0.6 to 0.7 mm for pitches of 19 fins per inch and 26 fins per inch, respectively, can be made as small as 0.3 to 0.4 mm, according to the technique of the invention. That is, the compression-forming amount is extremely small when the tube is processed by the technique in accordance with the invention.

Hereinafter, experimental examples of this second embodiment will be described as experimental examples 2, 3 and 4.

Experimental Example 2

A copper tube of 18.88 mm outer dia. and 1.19 mm thick was processed by means of the rolling tool 18 as shown in FIG. 6.

More specifically, the rolling tool 18 incorporated fin-forming disk tools 15 . . . having an outer dia. of 52.45 mm, breadth at the outer end of 0.35 mm and taper angle of both side walls of 4°, as well as a first and a second stages of compression-forming disk tools 16, 17 having respective outer dias. of 51.2 mm and 51.6 mm and a common breadth of 0.65 mm.

During the processing of the copper tube by the above stated rolling tool, at first thick-walled fins 19 . . . of 0.75 mm height were formed at a pitch of 35 fins per inch and, subsequently, the fins were deformed to form a heat transfer tube for a boiling type heat exchanger having a surface mechanism with cavities 12 of 0.4 mm deep and gaps 13 of 0.03 mm breadth, as well as fins 14 of 0.35 mm high and 0.1 mm wide, as shown in FIG. 5.

Experimental Example 3

A copper tube 18.88 mm outer dia. and 1.19 mm thick was processed by means of a rolling tool 18' as shown in FIG. 9. More specifically, the rolling tool 18' incorporated fin-forming disk tools 15 . . . having an outer dia. of 52.45 mm, breadth at the outer end of 0.35 mm and taper angle of both side walls of 4°, as well as a first and a second stages of compression-forming disk tools 16, 17 having respective outer dias. of 51.4 mm and 51.7 mm and respective breadths of 0.65 mm and 0.48 mm.

During the processing of the copper tube by the above stated rolling tool, at first thick-walled fins 19 . . . of 0.8 mm height were formed at a pitch of 35 fins per inch and, subsequently, the fins were deformed to form a heat transfer tube for a boiling type heat exchanger having a surface condition having cavities 12 of 0.35 mm deep and gaps 13 of 0.025 mm breadth, fins 14 of 0.45 mm high and 0.12 mm breadth, and steps 20 of 0.15 mm high and 0.08 mm breadth.

Experimental Example 4

Figure 11:
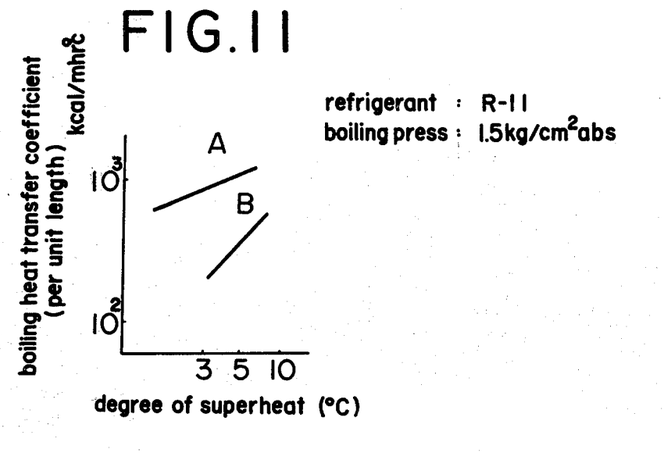
FIG. 11 is a graphical representation of the performance of the heat transfer tube of the second embodiment.

FIG. 11 graphically shows the measured boiling heat transfer coefficient per unit length of the heat transfer tube A in accordance with the experimental example 2, in case of freon R-11, in comparison with that of a heat transfer tube B made of copper and provided with ordinary fins of 0.86 mm high and pitched at 35 fins per inch.

It will be seen from FIG. 11 that the heat transfer tube A in accordance with the invention exhibits a boiling heat transfer coefficient much superior to that of the conventional heat transfer tube B.

As has been described, according to the invention, the heat transfer tube is provided on its surface with a number of cavities which communicate with outside space through narrow gaps, so as to allow voids to remain on the tube surface to promote the nucleous boiling of low temperature liquid, as well as fins for increasing the heat transfer area on the tube surface. Thus, the heat transfer tube in accordance with the invention shows a specifically excellent heat transfer performance especially when it is used in heating a low temperature liquid containing bubbles. In addition, since the method of this embodiment requires only a small amount of compression-forming, the processing can easily be performed even with tubes made of hard materials, and an uniform surface condition is obtained over the entire surface of the tube, so as to provide a heat transfer tube for boiling type heat exchangers of reduced fluctuation of heat transfer performance over the whole tube surface.

Third Embodiment

Figure 12:
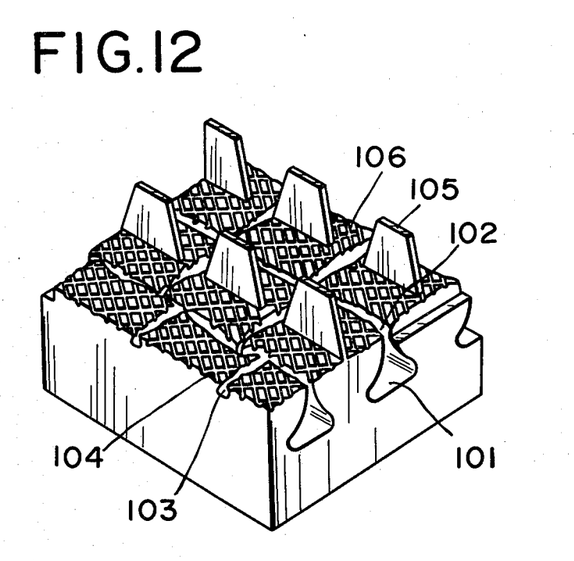
FIG. 12 is a partial enlarged view of the surface of a heat transfer tube having a surface condition of the third embodiment of the invention.
Figure 13:
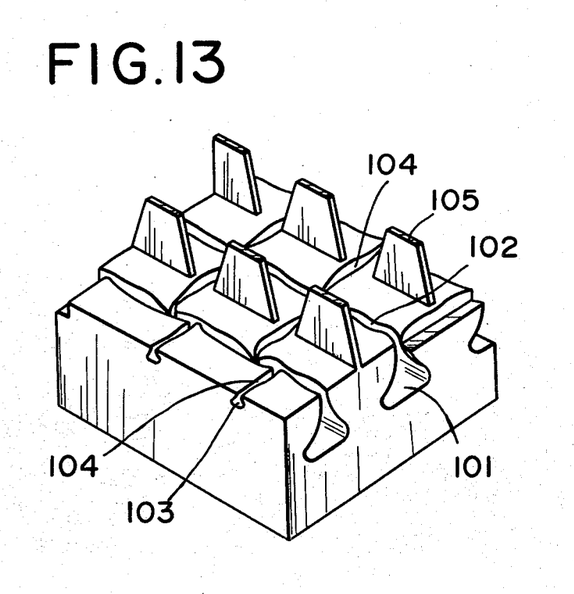
FIG. 13 is a partial enlarged view of the same portion as FIG. 12 with the knurled surface being removed.

Referring now to FIGS. 12 and 13 illustrating in an enlarged scale a portion of the heat transfer surface of a heat transfer tube in accordance with the third embodiment of the invention, annular or spiral cavities 101 running in the circumferential direction of the tube is disposed under the surface of the tube at a desired pitch in the axial direction of the tube. At the same time, small cavities or grooves 103 extending in the axial direction of the tube are also disposed under the surface of the tube at portions of the latter between adjacent cavities 101, 101, at a desired pitch in the circumferential direction of the tube. The portions of each first-mentioned circumferential cavity 101 intersecting the second-mentioned axial small cavities or grooves 103 have different shape and size from the intermediate portions of the same cavity. Thus, the shape and size of the circumferential cavities differ in various manner in the longitudinal direction of the latter, in accordance with the change of positions of the adjacent small cavities or grooves 103 relative to the circumferential groove.

This change of the size and shape of cavities 101 is more effective in achieving a good nucleous boiling of the liquid, as compared with cavities which have constant size and shape over their entire lengths. Numeral 102 denotes substantially continuous gaps through which each first-mentioned cavity 101 communicates the outside space or, occasionally, openings formed discontinuously at a pitch equal to that of the second-mentioned small cavities or grooves 102. The gap or opening 102, which has an irregular form including corrugations or concavities and convexities, is also effective to promote the nucleous boiling, as compared with those having simple configuration. The maximum mean breadth of the opening 102 has to be 0.13 mm or smaller.

The second-mentioned axially extending small cavities 103 are also made to communicate the outside space through gaps or openings 104 the maximum mean breadth of which is preferably 0.13 mm or smaller also.

It is possible to make the small cavities 103 to have a total length substantially equal to that of the spiral or annular cavities 101. Thus, the surface condition of this embodiment can have much increased density of boiling nuclides and, accordingly, much improved heat transfer performance, over that of the foregoing embodiment consisting solely of annular or spiral cavities 101. This advantage can be expected even when the small cavities 103 assume a form of grooves 103, because the grooves 103 are still effective to form complicated shape and surface condition of the tube which in turn contribute to form nuclides of voids for promoting the boiling.

The mountain-shaped fins 105, which are formed between adjacent spiral or annular cavities 101, 101 and, in the circumferential direction, between the small cavities or grooves 103, 103, functions effectively to contribute to improve the heat transfer performance, making efficient use of their characteristics as fins, especially when the liquid flow is a turbulent flow rich in bubbles.

The knurled surface 106 as shown in FIG. 12, provided over the entire surface of the tube, excepting the portion of the fins 105, forms a heat transfer surface having a larger number of boiling nuclide and therefore is more effective to improve the heat transfer performance than the flat surface having no knurled area as shown in FIG. 13.

The above stated fins and knurled surface are not essential, and one or both of them can be eliminated.

On the other hand, the heat transfer tube of the invention can easily be manufactured by effecting a compression-forming subsequent to the formation of fins on a smooth tube surface. The fins may be formed to have either the annular or spiral shape, in either case of rolling or cutting. Also, the fins may be singular or plural. At the same time, the formation of the fins and the compression-forming may be performed simultaneously or independently.

Hereinafter, the method of producing the heat transfer tube of this embodiment will be described in detail with reference to the drawings.

Figures 14, 15, 141, 142:
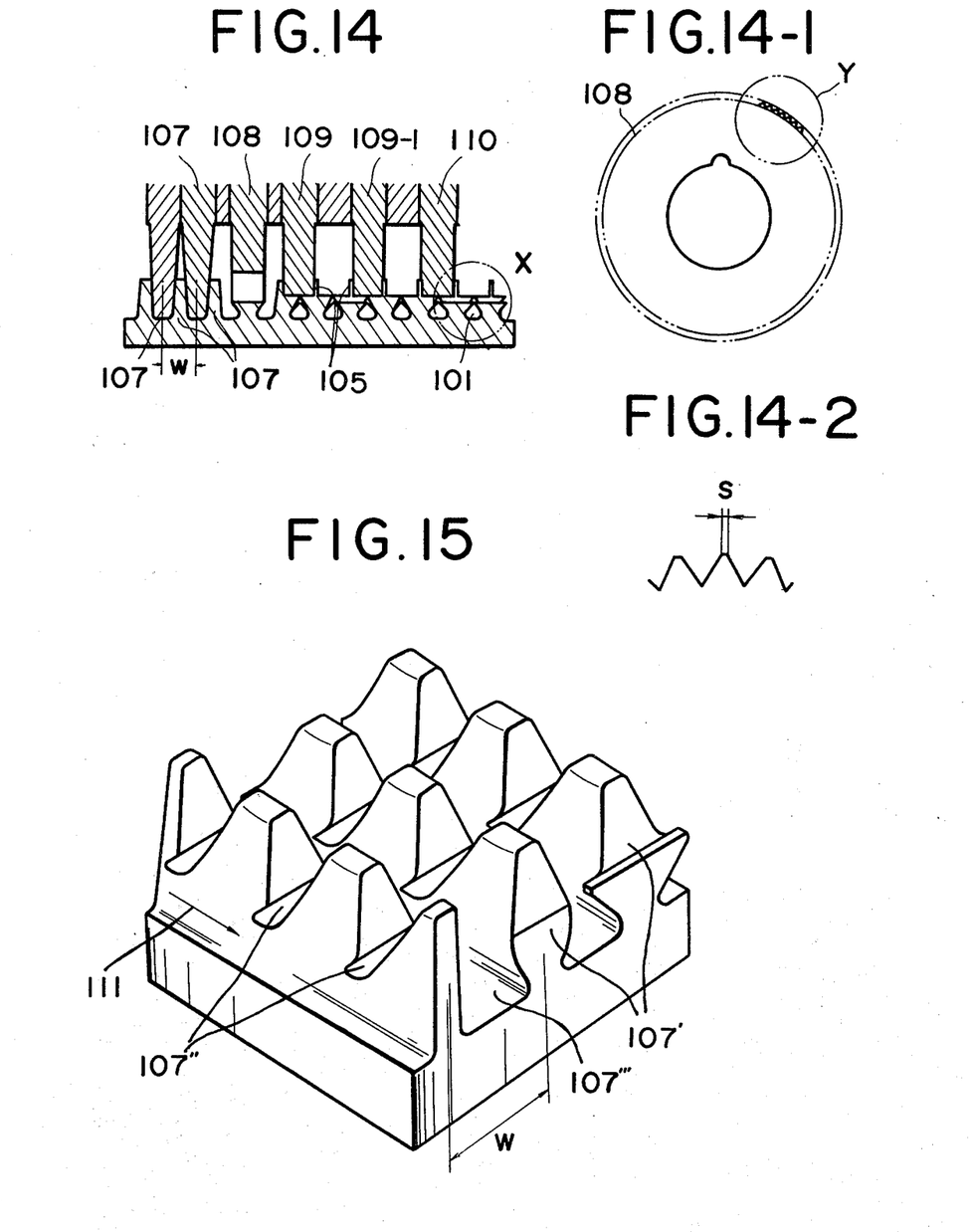

Referring to FIG. 14 showing an example of the method of producing of this heat transfer tube, a plurality of tools, which are employed in the processing, from the formation of the fins to the completion of compression-forming of the fins, are mounted exemplarily on a common axis of rotation. Also, the tube is shown in section along its longitudinal axis in an enlarged scale. The portion encircled by a chain-line circle X shows the state of the tube surface after the completion of the processing.

In FIG. 14, reference numeral 107 denotes the final stage of disk tool for forming fins 107' on the tube surface, while reference numeral 108 denotes the first stage of compression-forming disk tool provided with a number of mountain-shaped teeth over its entire periphery, as shown in FIG. 14-1. The diameter of the compression-forming disk tool 108 is selected to be slightly smaller than that of the above stated fin-forming disk tool 107, and the pitch of the peripheral teeth is selected optionally. However, each of the peripheral teeth has to have a certain circumferential breadth as denoted by S in FIG. 14-2.

FIG. 15 shows an example of the shape of the fins 107' which have been compressed and formed by the first stage compression-forming disk tool 108.

Namely, as the first stage compression-forming disk tool 108, which has mountainous-shaped teeth as shown in the chain-line circle Y in FIG. 14-1, as well as in FIG. 14-2, is rolled on the crests of the fins 107' in the direction of an arrow 111, the fins 107' are compressed and formed to have a gear-like configuration conforming to the shape of the mountainous shape of the peripheral teeth of the disk tool 108. During this rolling, the mass of metal of the valley portion 107" is spread in the direction perpendicular to the direction of the fins 107', i.e., in the direction perpendicular to the arrow 111, into the space 107''' between adjacent fins 107', 107'. The amount of spreading compression-forming is greatest at the bottom of the valley 107". In this forming process, the compression stress generated in the metal immediately under the valley portion 107" is conveniently diminished due to the shape of the tool 108 and distribution of compressing force, so that the amount of compression-forming by buckling is not so large.

When the fin 107 to be compression-forming is singular, the fin 107 is formed one by one by the compression-forming tool 108. In case that the fin 107 to be compression-formed is in plural, a plurality of fins 107 may be compression-formed simultaneously by a single compression-forming tool 108, or a plurality of compression-forming tools 108 may be used to form respective fins 107. Anyway, the crests and valleys of adjacent fins 107' can have any desired relative positional relationship.

Subsequently, second compression-forming tools 109, 109-1 as shown in FIG. 14 are applied to the tops of the fins 107' which have been formed to have gear-like configuration. The tool 109 has an outer diameter which is usually slightly smaller than that of the tool 108 and a thickness smaller than the pitch w of the fins 107'. The tool 109-1 has an outer diameter slightly larger than that of the tool 109. The both edges of the outer peripheries of these second compression-forming tools 109 and 109-1 are keened to play the role of shears and have angle preferably not larger than 90°.

FIG. 13 shows an example of the tube surface having been subjected to the processing by the second compression-forming tools 109, 109-1. The surface condition of the heat transfer tube of this embodiment is formed basically by the above described procedure. Namely, as the shoulders of mountains of adjacent gear shaped fins 107', 107' are compressed from the upper side, at spaces 107''' between adjacent fins by the compression-forming tools 109, 109-1, the mountains of the fins are compressed and formed at their both lateral sides and front and rear sides, leaving thin-walled fins 105, so as to form cavities 101 at portions 107''' between the fins and small cavities or grooves 103 at valley portions 107".

Although two compression-forming tools 109, 109-1 are used in the example as shown in FIG. 14, it is possible to use more than two tools of different diameters and widths, or the processing may be performed by only one tool.

Figure 17:
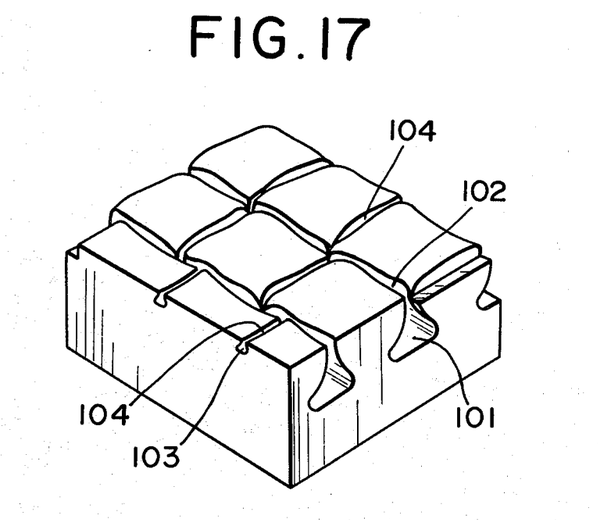
FIG. 17 is a partial enlarged view of the heat transfer surface of this embodiment showing the surface condition as shown in FIG. 13 with the fins being removed.

At the same time, if the thin-walled mountain-shaped fins 15 are to be eliminated, the breadth of the tool 109 is selected to be larger than the pitch w of the fins. In such a case, whole parts of the mountains of fins 107', 107' are compressed and formed to provide a surface condition having no fins as shown in FIG. 17.

A surface condition as shown in FIG. 12 will be obtained by processing by means of a knurling roll 110 which has an outer diameter slightly larger than that of the tool 109-1 and a breadth equal to or slightly smaller than that of the tool 109-1 as shown in FIG. 14. This surface condition which ensures a better performance and improved stability over the surface condition as shown in FIG. 13.

Figure 16:
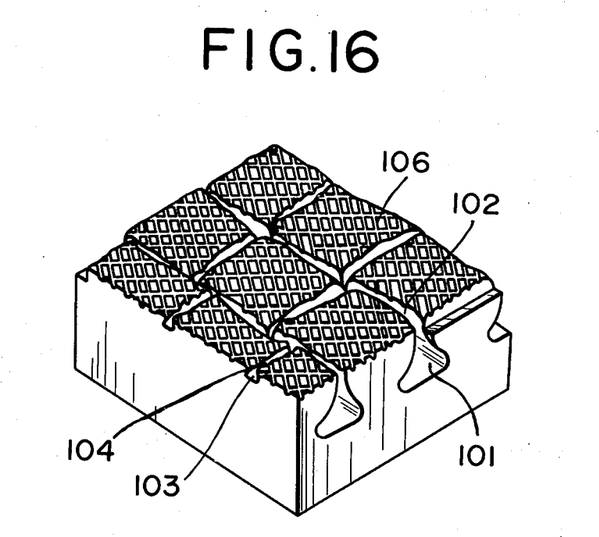
FIG. 16 is a partial enlarged view of the heat transfer surface of the embodiment as shown in FIG. 12 with the fins being removed.

The shape and the size of the knurling tool can be selected as desired. However, the breadth of the knurling roll 110 is preferably larger than the pitch w of the fins, when the breadth of the tool 109 has been selected larger than the same pitch w. By doing so, a surface condition having no fin 105, as shown in FIG. 16, will be obtained.

Hereinafter, an experimental example of this embodiment will be shown as the fifth experimental example of the invention.

Experimental Example 5

Two starts of fins 107' were formed at a pitch of 35 fins per inch, on the surface of a copper tube having an outer diameter of 18.88 mm and a thickness of 1.35 mm, in accordance with the method as shown in FIG. 14. Then, the first step of forming was carried out by means of a saw-like tool 108 of 51.6 mm dia. and having 216 peripheral teeth. The second step of compression-forming was effected in two stages by means of a tool 109 of 51.2 mm dia. and 1.4 mm thick and a tool 109-1 of 51.7 mm dia. 1.4 mm thick. The breadth or thickness of 1.4 mm of the compression-forming tools 109 and 109-1 for the second step of compression-forming is larger than the pitch of 0.726 mm (1/35 inches) of the fins, so that fins 105 as shown in FIGS. 12 and 13 were not formed, and a surface condition as shown in FIG. 17 was obtained.

The bottom of the valley 107" as shown in FIG. 15 which had been formed as a result of the first step of compression-formed has been depressed by about 0.2 mm, as a result of the second step of compression-forming.

Finally, a knurling of woven pattern was performed by means of a tool 110 of 51.8 mm dia, a pitch of 0.5 mm and breadth of 0.85 mm.

Consequently, a heat transfer tube of 18.38 mm outer dia. was obtained to have a surface condition which includes, as shown in FIG. 16, two starts of spiral gaps 102 of a mean breadth of 0.06 mm, cavities 101 corresponding to these gaps, gaps or openings 104 which extend in the axial direction so as to connect the adjacent spiral gaps 102 and which are disposed in the circumferential direction of the tube at a pitch of about 0.75 mm, small cavities 103 corresponding to these gaps or openings 104 and knurled surface 106 formed over the entire area of the tube surface.

Experimental Example 6

Two starts of fins 107' were formed at a pitch of 35 fins per inch, on the surface of a copper tube of 18.88 mm outer dia. and 1.35 mm thick, in accordance with the process as shown in FIG. 14. Subsequently, the first step of compression-forming was performed by means of a saw-like tool 108 of 51.6 mm dia. and having 216 peripheral teeth. Then, the second step of compression-forming was effected in two stages, by means of a tool 109 of 51.3 mm dia. and 0.62 mm thick and a tool 109-1 of 51.75 mm dia. and 0.62 mm thick. The bottom of the valley 107" as shown in FIG. 15, which had been formed by the first step of compression-forming, has been depressed by about 0.2 mm, as a result of the second step of compression-forming.

Finally, a woven-pattern knurling of outer diameter of 51.8 mm and breadth of 0.6 mm was effected.

Consequently, a heat transfer tube of 18.88 mm dia. and having a surface condition as shown in FIG. 12 was obtained. More specifically, this surface mechanism includes two starts of spiral continuous gaps or openings 102 of a mean breadth of 0.04 mm, cavities 101 corresponding to these gaps or openings, openings or gaps 104 of a mean breadth of 0.07 mm extending so as to connect the adjacent gaps 102 in the axial direction of the tube and disposed in the circumferential direction at a pitch of about 0.75 mm, small cavities corresponding to these gaps or openings 104, mountainous fins 105 of about 0.1 mm thick and about 0.25 mm high extending with their longitudinal sides aligned with the circumferential direction formed between the adjacent cavities 101, 101 and between, in the circumferential direction, the adjacent small cavities or grooves 103, 103, and a knurled surface 106 provided over the entire area of the tube surface excepting the portions of the mountainous fins 105.

Figure 18:
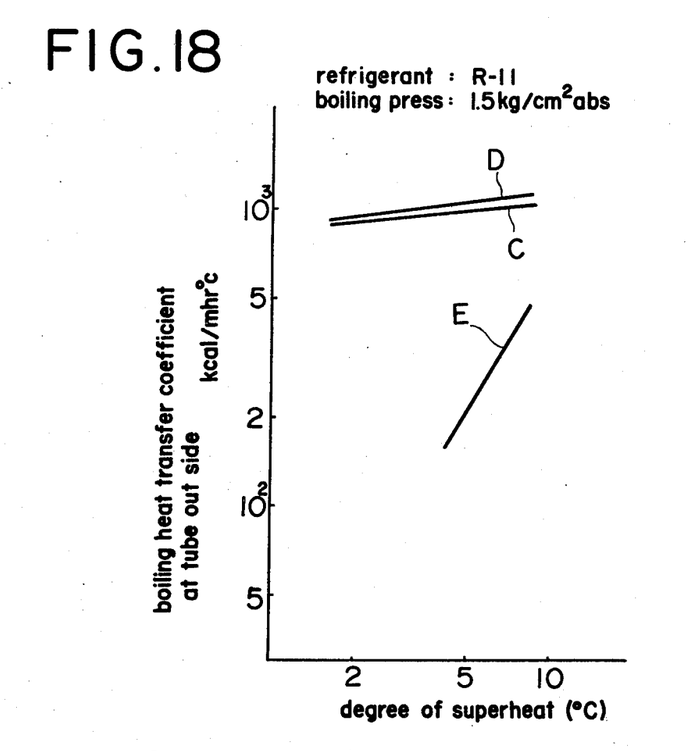
FIG. 18 is a graphical representation of the boiling heat transfer characteristics at the outside of tubes of the heat transfer tubes of the fifth and sixth embodiments of the invention in comparison with a conventional heat transfer tube.

FIG. 18 graphically shows the boiling heat transfer coefficients per unit length of the heat transfer tubes of the experimental examples 5 and 6, when Freon R-11 was used as the liquid to be boiled. The boiling heat transfer coefficients of the tubes of the examples 5 and 6 are shown by curves C and D, respectively. The curve E shows the boiling heat transfer coefficient per unit length of a conventional fin tube of a substantially same diameter (18.8 mm) and having 26 fins per inch, for a comparison purpose.

These curves were obtained by measuring with single tube. The boiling pressure was 1.5 Kg/cm² abs.

The advantageous features and operations of the invention can be summarized as follows.

(1) Hitherto, various types of surface condition of heat transfer tube have been proposed for improving the boiling performance. However, in most of these conventional surface conditions, cavities are formed to extend only in one direction, e.g. in the circumferential direction of the tube. Thus, for further improving the performance, it has been necessary to make the pitch of the cavity fine, which is extremely difficult to obtain and costly. However, according to the invention, since the mechanism for promoting the boiling are formed to extend not only in the circumferential direction but also in the axial direction of the tube, a heat transfer tube having a further improved boiling performance can be produced without substantial difficulty.

(2) In the surface condition of the heat transfer tube of the invention, the annular or spiral cavities extend continuously with the cross-sectional shape irregularly changing in the longitudinal direction of these cavities. This greatly contribute to promote the boiling action.

(3) The deterioration of the performance, which is likely to take place when the tube is used in a liquid rich in bubbles, is effectively prevented by providing thin-walled mountainous fins over the entire area of the tube surface.

(4) The outer diameter of the heat transfer tube having the surface condition in accordance with the invention does not become larger than that of the original tube blank. At the same time, skip portion may be optionally provided, as is the case of low-fin tubes. In addition, the tube of the invention can be formed only in one step of process. Therefore, the tube of the invention can be handled as easily as ordinary smooth-surfaced tubes and low-fin tubes, and can be produced with relatively low cost of production.

What is claimed is:

1. A process for producing a heat transfer tube for use in boiling type heat exchangers, comprising the steps of:
   (a) contacting a fin-forming disk tool with the surface of a metal tube in order to form fins having side walls extending upward from said tube to a top fin surface;
   (b) contacting a roller disk tool with said top surfaces of said fins compressing and forcing said top surfaces downward to such an extent that said fins are compressed resulting in widening of said fins near said top surfaces forming shoulders on said fins and cavities between adjacent fins, said roller disk tool having a circumferential surface which contacts said top surfaces of said fins, said surface of said roller disk tool being positioned directly over said cavities and having a breadth such that a portion of said surface will contact, in equal amounts, a portion of the top surfaces of only two adjacent fins, and said cavities communicating with the outside through narrow gaps formed between adjacent shoulders of said adjacent fins.

2. A process for producing a heat transfer tube as in claim 1, wherein said fins are formed in an annular pattern on said tube surface.

3. A process for producing a heat transfer tube as in claim 1, wherein said fins are formed in a spiral pattern on said tube surface.

4. A process for producing a heat transfer tube as in any of claims 1, 2, or 3 wherein said roller disk tool forces said top surfaces downward at portions near said side walls while allowing a center portion of said top surface to remain uncompressed in such a manner that said uncompressed center portion forms a fin extending upward from said top surface.

5. A process for producing a heat transfer tube as in claim 1, wherein said surface of said roller disk tool has a breadth larger than said top surface of one of said fins.

6. A process for producing a heat transfer tube as in claim 4, wherein said surface of said roller disk tool has a breadth smaller than said top surface of said fin.

* * * * *